(12) United States Patent
Emad et al.

(10) Patent No.: US 8,309,193 B2
(45) Date of Patent: Nov. 13, 2012

(54) FLUID TRANSFER MULTI-LAYER TUBE BASED ON A POLYAMIDE AND AN ETHYL VINYL ALCOHOL OR POLYVINYL ALCOHOL

(75) Inventors: Mehdi M. Emad, Collegeville, PA (US); Franck Bertoux, Montreal, CA (US); Gregory S. O'Brien, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 193 days.

(21) Appl. No.: 12/513,257

(22) PCT Filed: Oct. 24, 2007

(86) PCT No.: PCT/US2007/082332
§ 371 (c)(1),
(2), (4) Date: May 1, 2009

(87) PCT Pub. No.: WO2008/057763
PCT Pub. Date: May 15, 2008

(65) Prior Publication Data
US 2010/0062201 A1    Mar. 11, 2010

Related U.S. Application Data

(60) Provisional application No. 60/855,921, filed on Nov. 1, 2006.

(51) Int. Cl.
*B32B 1/08* (2006.01)

(52) U.S. Cl. .................................... 428/36.91; 138/137

(58) Field of Classification Search ............... 428/36.91, 428/36.7, 474.9, 476.9, 542.239; 138/137, 138/141
See application file for complete search history.

(56) References Cited

U.S. PATENT DOCUMENTS

| | | | |
|---|---|---|---|
| 5,419,374 A | 5/1995 | Nawrot et al. | |
| 5,795,939 A | 8/1998 | Lorek | |
| 5,939,492 A | 8/1999 | Lorek | |
| 6,040,025 A | 3/2000 | Lorek | |
| 6,041,826 A | 3/2000 | Lorek et al. | |
| 6,143,415 A | 11/2000 | Lorek et al. | |
| 6,257,281 B1 | 7/2001 | Nie et al. | |
| 6,491,994 B1 * | 12/2002 | Kito et al. | 428/36.5 |
| 6,555,243 B2 | 4/2003 | Flepp et al. | |
| 6,615,877 B2 | 9/2003 | Zimmer et al. | |
| 7,063,873 B2 | 6/2006 | Bellet et al. | |
| 2002/0155242 A1 * | 10/2002 | Bellet et al. | 428/36.91 |
| 2005/0025920 A1 | 2/2005 | Stolarz et al. | |
| 2009/0314375 A1 | 12/2009 | Flat et al. | |

FOREIGN PATENT DOCUMENTS

WO    WO 94/29626    12/1994

* cited by examiner

*Primary Examiner* — Rena Dye
*Assistant Examiner* — Yan Lan
(74) *Attorney, Agent, or Firm* — Thomas F. Roland

(57) ABSTRACT

The present invention relates to a symmetrical multi-layer tube based on polyamide and ethyl vinyl alcohol (EVOH) or polyvinyl alcohol (PVOH) for transferring fluids. As examples of tubes for transferring fluids, mention may be made of fuel (gasoline, diesel fuel) pipes, in particular for carrying fuel from the tank to the engine of motor vehicles. Other examples of fluid transfer include, but are not limited to, the fluids used in fuel cells, $CO_2$ systems for cooling, hydraulic systems, cooling circuits and air-conditioning circuits, and medium-pressure power transfer.

4 Claims, 1 Drawing Sheet

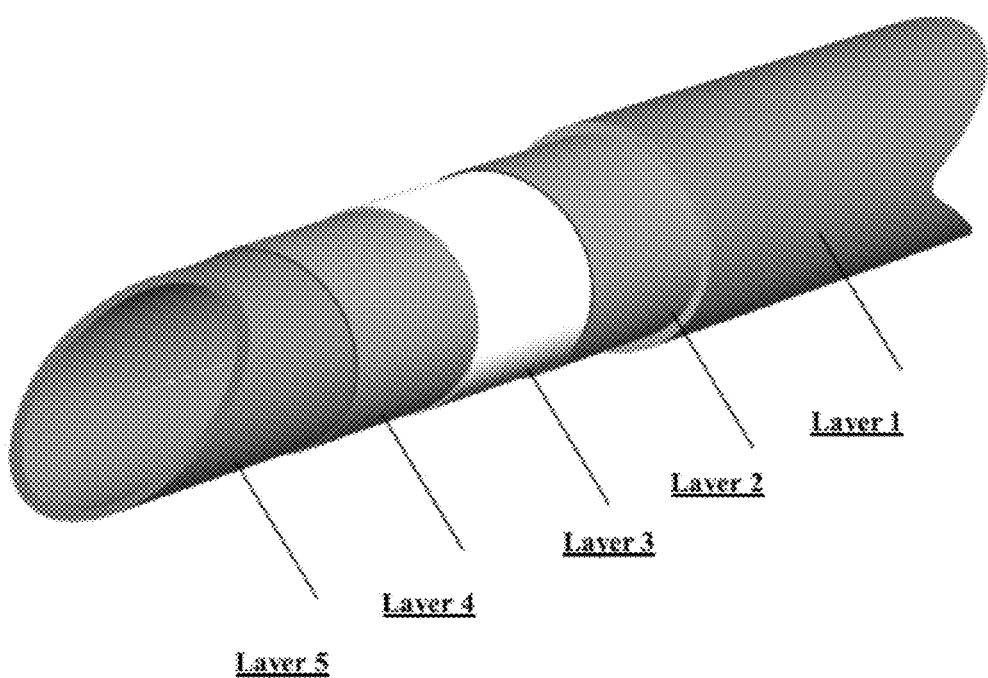

FLUID TRANSFER MULTI-LAYER TUBE BASED ON A POLYAMIDE AND AN ETHYL VINYL ALCOHOL OR POLYVINYL ALCOHOL

This application claims benefit, under U.S.C. §119 or §365 of U.S. Ser. No. 60/855,921, filed Nov. 1, 2006; and PCT/US2007/082332 filed Oct. 24, 2007.

FIELD OF THE INVENTION

The present invention relates to a symmetrical multi-layer tube based on polyamide and ethyl vinyl alcohol (EVOH) or polyvinyl alcohol (PVOH) for transferring fluids.

As examples of tubes for transferring fluids, mention may be made of fuel (gasoline, diesel fuel) pipes, in particular for carrying fuel from the tank to the engine of motor vehicles. Other examples of fluid transfer include, but are not limited to, the fluids used in fuel cells, $CO_2$ systems for cooling, hydraulic systems, cooling circuits and air-conditioning circuits, and medium-pressure power transfer.

BACKGROUND OF THE INVENTION

For safety and environmental protection reasons, motor-vehicle manufacturers require fuel tubes to have good mechanical properties, such as burst strength and flexibility, good cold (−40° C.) impact strength and high-temperature strength, a very low permeability to hydrocarbons and to their additives, particularly alcohols such as methanol and ethanol. These tubes must also have good resistance to the fuels and lubrication oils for engines. These tubes are manufactured by co-extruding the various layers using standard techniques for thermoplastics.

One type of tube used in these applications is based on a polyamide/fluoropolymer structure, such as in European patent number EP 558 373. The petrol permeability is excellent but the shock resistance is insufficient.

Multi-layer tubes, such as described in EP 696 301, EP 740 754 and EP 726 926 disclose tubes for transporting fuel, which comprise respectively a polyamide outer layer, a tie layer, a PVDF (polyvinylidene fluoride) layer, a tie layer and a polyamide inner layer in contact with the petrol. Adhesion between PVDF and polyamides is difficult due to the inertness of the PVDF.

Ethyl vinyl alcohol (EVOH) and polyvinyl alcohol (PVOH) can be used as a less expensive barrier layer. It also has a density differential advantage, and can provide a better permeation barrier for many hydrocarbon components.

One difficulty with multi-layer tubing is that the thickness of the layers and the unsymmetrical design can produce undesired stress during manufacture and use. These stresses can lead to splitting, resulting in serious safety concerns for low permeable multi-layer fuel tubing.

Surprisingly, it has now been found that by combining more flexible polyamide inner and outer layers with an EVOH or PVOH layer, with a symmetrical design, the safety issues caused by splitting of a multi-layer tubing can be resolved.

SUMMARY OF THE INVENTION

The invention relates to a symmetrical multi-layer tube comprising, in its radial direction from the outside inwards:
a) a polyamide outer layer (1);
b) an adhesive layer (2);
c) an ethyl vinyl alcohol and/or polyvinyl alcohol layer (3);
d) an adhesive layer (4); and
e) a polyamide inner layer (5),
wherein said inner and outer polyamide layers have essentially the same thickness and essentially the same composition; wherein said adhesive layers (2) and (4) have essentially the same thickness and essentially the same composition, and wherein the layers being successive and adhering to one another in their respective contact region.

According to one advantageous embodiment, the polyamide of the outer layer (1) is a polyamide having amine terminal groups or comprising more amine terminal groups than acid terminal groups.

According to one advantageous embodiment, a layer of a polyamide having amine terminal groups or one comprising more amine terminal groups than acid terminal groups is placed between the outer layer (1) and the layer (2).

These tubes may have an outside diameter of 6 to 110 mm and a thickness of around 0.5 to 5 mm.

Advantageously, the thickness of the inner and outer layer (1 and 5) represents between 70 and 90% of the thickness of the tube.

The tube of the present invention has a very low permeability to fuel, especially to hydrocarbons and to their additives, in particular alcohols like methanol and ethanol, or even ethers such as MTBE or ETBE. These tubes also have good resistance to fuels and to lubricating oils for engines.

This tube exhibits very good mechanical properties at low temperature and at high temperature.

The invention also relates to the use of these tubes for transporting fuel.

BRIEF DESCRIPTION OF THE DRAWINGS

FIG. 1: Shows a cut-away drawing of the fuel line structure of the invention having a five-layer structure.

DETAILED DESCRIPTION OF THE INVENTION

By "symmetrical" as used herein to describe the structure of the multi-layer tube is meant that the inner and outer layers are the same polyamide and have essentially the same thickness—though the inner layer may can contain an electrical conducting material. The two adhesive layers will also have essentially the same thickness, and the same composition The middle layer is a ethyl vinyl alcohol (EVOH) and/or polyvinyl alcohol (PVOH) layer having a thickness of between 0.09 inches and 0.11 inches.

The multi-layer tube of the invention has at least five layers, but could also have 7 or 9 layers—symmetrical around the EVOH or PVOH center layer. A five layer structure will be described in detail, though one can use the same concept with an EVOH or PVZOH core, adhesive layer(s) and polyamide inner and outer layers, in structures having 2 or 4 additional layers.

With regard to the polyamide layers (1 and 5), the polyamide layers that form the inner and outer layers of the fuel line have the same thickness. Preferably, the compositions of these inner and outer polyamide layers are the same, with the exception that the inner layer preferably contains additional electrical conductive material. The inner layer may contain an electrical conductive material, such as, but not limited to carbon black, and carbon nanotubes. The polyamide can be, but is not limited to PA-11 and PA-12, which are a preferred embodiment. Mention may also be made of those of formula X, Y/Z or 6, Y2/Z in which: X denotes the residues of an aliphatic diamine having from 6 to 10 carbon atoms; Y denotes the residues of an aliphatic dicarboxylic acid having from 10 to 14 carbon atoms; Y2 denotes the residues of an aliphatic dicarboxylic acid having from 15 to 20 carbon atoms; and Z denotes at least one unit chosen from the residues of a lactam, the residues of an alpha, omega-aminocarboxylic acid, the unit X1, Y1 in which X1 denotes the residues of an aliphatic diamine and Y1 denotes the residues of an aliphatic dicarboxylic acid, where the weight ratios Z/(X+Y+Z) and Z/(6+Y2+Z) being between 0 and 15%.

Mention may be made by way of example of PA-6, 10 (hexamethylenediamine and sebacic acid units), PA-6, 12 (hexamethylenediamine and dodecanedioic acid units) and PA-10, 10 (1,10-decane diamine and sebacic acid units). The polyamide of the inner layer (3) may be chosen from the polyamides mentioned in the case of the outer layer, PA-6 and PA-6/polyolefin blends having a PA-6 matrix and a polyolefin dispersed phase.

The inherent viscosity of the polyamide of the inner and outer layers (1, 5) may be between 1 and 2 and advantageously between 1.2 and 1.8. The inherent viscosity is measured at 20° C. for a 0.5% concentration in metacresol. The polyamide may contain from 0 to 30% by weight of at least one product chosen from plasticizers and impact modifiers per 100 to 70% of polyamide respectively. This polyamide may contain the usual additives, such as UV stabilizers, thermal stabilizers, antioxidants, fire retardants, etc. The inner layer may contain an electrical conductive material, such as, but not limited to carbon black, and carbon nanotubes, Advantageously, the impact modifier is chosen from elastomers and very low-density polyethylenes.

With regard to the adhesive layers (2 and 4): the adhesive layer is chosen to have an affinity for both the polyamide layers and for the EVOH or PVOH barrier layer. The choice of an effective adhesive depends on the polyamide used. In one embodiment, a blend of polyamide 6/12 and polyamide 12/6 is employed as the adhesive layer. Polyamide 6 adheres well to EVOH/PVOH, while polyamide 12 adheres well to the preferred PA 11 or PA 12. Additionally, this mixture can disrupt the crystallinity which can be a benefit for mechanical properties of the fuel tube.

Other useful adhesive layer compositions include LOTADER polymers (Arkema Inc.) and other adhesive or tie layers known for affinity to both polyamide and EVOH/PVOH.

In one embodiment, the adhesive layer contains impact modifier. To maintain symmetry of the hose construction, the adhesive layers (2 and 4) preferably are of the same composition. Using the same composition reduces stress within the structure, as well as providing manufacturing efficiencies.

With regard to the EVOH and/or PVOH: The middle layer (barrier layer) of the composition is EVOH and or PVOH having a thickness of from 0.080 inches to 0.110 inches.

It is known that the thickness of the barrier layer has an adverse effect on the mechanical properties of the tubing. A thickness of 130 micron (0.13 mm) and above can cause premature tubing failure (splitting). In order to reduce splitting at higher barrier layers special (costly) processing equipment is needed. This could be in the form of modification to the existing equipment (130 degrees F. bath and/or flaming) to cut the tubing on line and or specific cooling sequence. However, tubing of the invention requires no changes to the standard manufacturing equipment nor any specific procedure needed to avoid tube splitting during cutting and/or following the fitting assembly step. The thickness of the barrier layer is preferably about 0.110 mm+/−0.010 (range of 0.100-0.120 mm). This barrier layer thickness provides good permeation characteristics, as specified in SAE J2260 version 2005 for this type of multi-layer tubing construction.

One or more of the layers may also contain typical additives, including, but not limited to: pigments; antioxidants; fire retardants; UV stabilizers; nano-fillers; nucleating agents.

EXAMPLES

A tube was formed by coextruding the layers listed in Table 1. As can be seen, the tube is symmetrical in terms of thickness and composition, within strict tolerances. Note that the inner and outer polyamide layers are slightly different in composition.

TABLE 1

| Material | Target thickness (mm) | Tolerance (mm) | Temperatures (° C.) | | | | | | |
|---|---|---|---|---|---|---|---|---|---|
| | | | Bush | Zone 1 | Zone 2 | Zone 3 | Zone 4 | connector | Head |
| RILSAN AESN Black P210 TL (outside layer) | 0.4 | 0.36-0.44 | 20 | 180 | 200 | 220 | 230 | 235 | 230-250 |
| ORGALLOY HX256OT | 0.05 | 0.045-0.055 | 20 | 180 | 190 | 210 | 220 | 230 | 230-250 |
| EVOH | 0.1 | 0.09-0.11 | 20 | 190 | 210 | 220 | 230 | 235 | 230-250 |
| ORGALLOY HX256OT | 0.05 | 0.045-0.055 | 20 | 180 | 190 | 210 | 220 | 230 | 230-250 |
| RILSAN AESN Black P410 TL (outside layer) | 0.4 | 0.36-0.44 | 20 | 190 | 220 | 240 | 250 | 250 | 230-250 |

RILSAN AESN Black P210 TL and RILSAN AESN Black P410 are impact-modified nylon-12 from Arkema Inc.
ORGALLOY HX256OT is a polyamide alloy from Arkem, Inc.

What is claimed is:

1. A symmetrical multi-layer tube comprising, in its radial direction from the outside inwards:
    a) a polyamide outer layer (1);
    b) an adhesive layer (2);
    c) an ethyl vinyl alcohol and/or polyvinyl alcohol layer (3);
    d) an adhesive layer (4); and
    e) a polyamide inner layer (5),
wherein said inner and outer polyamide layers have the same thickness and the same composition, comprising PA 11 or PA 12; wherein said adhesive layers (2) and (4) have the same thickness and the same composition, and wherein the layers being successive and adhering to one another in their respective contact region.

2. The tube according to claim 1, in which the polyamide of the outer layer (1) is a polyamide having amine terminal groups or comprising more amine terminal groups than acid terminal groups.

3. The tube of claim 1 comprising a tube for transporting hydrocarbon fuel.

4. The tube of claim 1, wherein said ethyl vinyl alcohol and/or polyvinyl alcohol layer (3) has a thickness of from 0.100 to 0.12 mm.

* * * * *